(12) United States Patent
Ripper et al.

(10) Patent No.: US 11,764,515 B2
(45) Date of Patent: Sep. 19, 2023

(54) MAT SEAL FOR AN ELECTRICAL CONNECTOR

(71) Applicant: TE Connectivity Germany GmbH, Bensheim (DE)

(72) Inventors: Hartmut Ripper, Bensheim (DE); Joerg Wagner, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 366 days.

(21) Appl. No.: 17/012,320

(22) Filed: Sep. 4, 2020

(65) Prior Publication Data
US 2021/0075151 A1   Mar. 11, 2021

(30) Foreign Application Priority Data

Sep. 5, 2019   (DE) .......................... 102019213482.3

(51) Int. Cl.
| | | |
|---|---|---|
| *H01R 13/52* | (2006.01) | |
| *B29C 45/14* | (2006.01) | |
| *B29C 45/16* | (2006.01) | |
| *B29L 31/26* | (2006.01) | |
| *B29L 31/36* | (2006.01) | |
| *B29L 31/00* | (2006.01) | |

(52) U.S. Cl.
CPC ... *H01R 13/5219* (2013.01); *B29C 45/14786* (2013.01); *B29C 45/16* (2013.01); *B29K 2313/00* (2013.01); *B29L 2031/26* (2013.01); *B29L 2031/36* (2013.01); *B29L 2031/726* (2013.01)

(58) Field of Classification Search
CPC .......... H01R 13/5219; B29C 45/14786; B29C 45/16; B29K 2313/00
USPC ........................................................ 439/271
See application file for complete search history.

(56) References Cited

U.S. PATENT DOCUMENTS

| 2,273,182 A | 2/1942 | Dodge |
| 4,152,479 A | 5/1979 | Larsen |
(Continued)

FOREIGN PATENT DOCUMENTS

| DE | 9317478.0 | 3/1994 |
| DE | 198 28 982 A1 | 1/1999 |
(Continued)

OTHER PUBLICATIONS

Extended European search report in Appln. No. 20193683.8-1201, dated Mar. 25, 2021, 9 pp.

(Continued)

*Primary Examiner* — Alexander Gilman
(74) *Attorney, Agent, or Firm* — Barley Snyder

(57) ABSTRACT

A mat seal for an electrical connector includes a plurality of through-holes extending in a through-hole direction through the mat seal, a grid of a first material having a plurality of grid meshes, the grid is arranged with the through-holes extending through the grid meshes, a first material layer of a second material disposed on a first side of the grid, and a second material layer of a third material disposed on a second side of the grid opposite the first side. The first material of the grid has a greater compression modulus than the second material of the first material layer and the third material of the second material layer.

19 Claims, 4 Drawing Sheets

(56) References Cited

U.S. PATENT DOCUMENTS

| | | | | |
|---|---|---|---|---|
| 5,839,920 A * | 11/1998 | Yurko | H01R 13/521 | 439/587 |
| 6,176,739 B1 * | 1/2001 | Denlinger | H01R 13/5208 | 439/589 |
| 6,530,577 B1 * | 3/2003 | Busby | B32B 27/04 | 277/651 |
| 7,140,897 B2 | 11/2006 | Axenbock et al. | | |
| 7,862,049 B2 * | 1/2011 | Olson | F16J 15/122 | 277/654 |
| 7,905,498 B2 * | 3/2011 | Dempsey | F16J 15/122 | 277/654 |
| 7,984,919 B2 * | 7/2011 | Nitsche | B62D 25/088 | 156/79 |
| 8,002,332 B2 * | 8/2011 | Coon | F16B 11/006 | 296/187.02 |
| 8,181,327 B2 * | 5/2012 | Apfel | F16B 5/00 | 156/92 |
| 8,691,033 B1 * | 4/2014 | Busby | C09J 5/00 | 156/289 |
| 8,766,108 B2 * | 7/2014 | Bunyan | H02G 13/00 | 174/358 |
| 9,016,697 B2 * | 4/2015 | Boyd | F16J 15/021 | 277/640 |
| 9,194,408 B2 * | 11/2015 | Apfel | B60R 13/00 | |
| 9,303,447 B1 * | 4/2016 | Dry | F16J 15/121 | |
| 9,671,023 B2 * | 6/2017 | Boyd | F16J 15/122 | |
| 9,701,388 B2 * | 7/2017 | Busby | H04L 1/0045 | |
| 10,190,688 B2 * | 1/2019 | Boyd | B32B 3/26 | |
| 10,591,062 B2 * | 3/2020 | Kinoshita | F16J 15/122 | |
| 10,604,230 B2 * | 3/2020 | Boyd | F16J 15/022 | |
| 10,837,555 B2 * | 11/2020 | Busby | F16J 15/122 | |
| 10,988,089 B2 * | 4/2021 | Prokopowicz | B60R 11/0235 | |
| 11,378,186 B1 * | 7/2022 | Boyd | F16J 15/102 | |
| 2004/0041356 A1 * | 3/2004 | Smith | F16J 15/061 | 277/651 |
| 2004/0070156 A1 | 4/2004 | Smith et al. | | |
| 2009/0305539 A1 * | 12/2009 | Chazottes | H01R 13/5208 | 439/271 |
| 2014/0167367 A1 * | 6/2014 | Busby | F16J 15/123 | 277/639 |
| 2015/0069722 A1 * | 3/2015 | Boyd | B64C 1/18 | 277/651 |
| 2016/0017999 A1 * | 1/2016 | Boyd | C22C 1/08 | 264/273 |
| 2016/0018000 A1 * | 1/2016 | Busby | C08L 75/02 | 277/650 |
| 2016/0033043 A1 * | 2/2016 | Busby | B64C 1/36 | 264/273 |
| 2017/0110826 A1 * | 4/2017 | Fujikawa | H01R 13/10 | |
| 2017/0179636 A1 * | 6/2017 | Yudate | H01R 4/18 | |
| 2019/0112026 A1 * | 4/2019 | Boyd | F16J 15/104 | |

FOREIGN PATENT DOCUMENTS

| | | |
|---|---|---|
| DE | 695 1 6 947 T2 | 5/2000 |
| DE | 69516947 T2 | 12/2000 |
| DE | 697 02 436 T2 | 1/2001 |
| DE | 103 32 298 A1 | 2/2005 |
| DE | 10 2004 035 201 A1 | 2/2006 |
| EP | 1715551 A2 | 10/2006 |
| EP | 2225804 B1 | 8/2016 |
| JP | 2015-204259 A | 11/2015 |
| JP | 2016-62814 A | 4/2016 |
| JP | 2016-103346 A | 6/2016 |
| JP | 2016-186851 A | 10/2016 |
| WO | 2013135419 A1 | 9/2013 |

OTHER PUBLICATIONS

German Office Action, dated May 12, 2020, 12 pages.
Abstract of WO 2013135419, dated Sep. 19, 2013, 1 page.
Abstract attached DE 695 16 947, dated Dec. 7, 2000, 1 page.
Abstract of DE 10 2004 035 201, dated Feb. 16, 2006, 1 page.
Abstract attached of JP 2016-86851, dated Oct. 17, 2016, 1 page.

\* cited by examiner

MAT SEAL FOR AN ELECTRICAL CONNECTOR

CROSS-REFERENCE TO RELATED APPLICATION

This application claims the benefit of the filing date under 35 U.S.C. § 119(a)-(d) of German Patent Application No. 102019213482.3, filed on Sep. 5, 2019.

FIELD OF THE INVENTION

The present invention relates to an electrical connector and, more particularly, to a mat seal for an electrical connector.

BACKGROUND

Connectors are often used in automotive engineering, for example, to reliably connect a number of electrical lines with each other both electrically and mechanically. The connector comprises a plug and a mating plug which engage with each other in a mechanically and electrically connected state. The plug and the mating plug each have an electrically non-conductive housing, for example, made of plastic. The housings are geometrically designed in such a way that a mechanical and electrical connection is obtained between the plug and the mating plug after they are plugged together.

A large number of cables (or wires or contacts) are typically inserted into the plug and mating plug, which are mechanically connected to the housing of the plug or mating plug, respectively. When the plug and mating plug are mated with each other, the ends of the cables held in the plug are brought into contact with the ends of the cables held in the mating plug, thus providing a reliable electrical contact between the cables of the plug and those of the mating plug. The ends of the cables may also have suitably shaped contact pins for mechanical and electrical contact between the respective cable ends.

For such connectors, it may be necessary to protect the contact points between the cable ends from the penetration of dirt or moisture, especially in automotive applications. For this purpose, connectors are often equipped with mat seals. The mat seal is typically made of an elastic material, such as a silicone, rubber or polymer material. The mat seal is held in the housing of the plug and/or mating plug, for example, by a pressure plate.

In connectors that are intended to connect a large number of contacts or cables, the mat seals have many through-holes. A cable can pass through each of these trough-holes from an outside of the connector to an inside of the connector. The through-holes of the mat seal have cross sections such that the mat seal fits tightly against a fed through cable in the area of a circumference of a through-hole. For this purpose, the respective through-hole typically has, at least in partial areas, a smaller internal cross section than the cross section of a cable to be fed through.

When the cables are fed through the mat seal, frictional forces which occur due to the tight-fitting mat seal must be overcome. Elastic deformation and compression of the material within the sealing mat occur. Particularly, if the diameter of a cable to be fed through is significantly larger than the cross-section of the corresponding through-hole, the material compressions that occur can generate strong radial forces applied to the cable, which can result in damages when the cable is fed through the through-hole. However, damages of the through-holes result in that sealing against moisture and dirt can no longer be guaranteed. Furthermore, the deformations can lead to such a displacement of adjacent through-holes that incorrect installation and thus incorrect contacts and also damage to cables, wires or contacts which are to be guided through the through-holes but hit the displaced material of the mat seal can occur.

SUMMARY

A mat seal for an electrical connector includes a plurality of through-holes extending in a through-hole direction through the mat seal, a grid of a first material having a plurality of grid meshes, the grid is arranged with the through-holes extending through the grid meshes, a first material layer of a second material disposed on a first side of the grid, and a second material layer of a third material disposed on a second side of the grid opposite the first side. The first material of the grid has a greater compression modulus than the second material of the first material layer and the third material of the second material layer.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present invention are explained in more detail below with reference to the drawings. It is understood that the embodiments do not exhaust the scope of the present invention. It is further understood that some or all of the features described below can be combined with each other in other ways.

Figure 1:
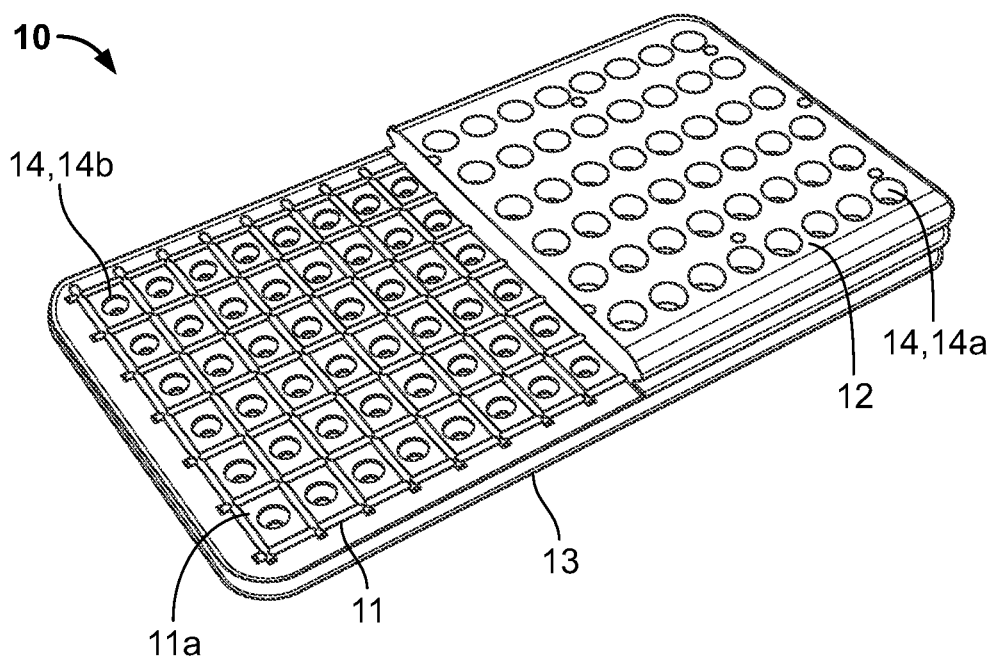
FIG. 1 is a partially sectional perspective view of a mat seal according to an embodiment.

A mat seal 10 according to an embodiment is shown in FIG. 1. The mat seal 10 comprises a grid 11 (or grid band or net or net band), which is arranged between a first material layer 12 and a second material layer 13. The mat seal 10 has through-holes 14 formed partly in the first material layer 12 (14a) and partly in the second material layer 12 (14b) and extending through grid meshes 11a of the grid 11 in a through-hole direction (i.e. substantially perpendicular to the grid meshes 11a).

The cross sections of the through-holes 14, 14a, 14b may vary within the first material layer 12 and/or second material layer 13, for example, decrease towards the grid 11, and sealing lips may be formed in through-holes 14, 14a, 14b in the vicinity of the grid 11. The meshes 11a of the grid 11, in an embodiment, can be partially filled with a material of the first material layer 12 and/or the second material layer 13. In various embodiments, the through-holes 14 may have any geometric (surface) shape, for example, round or rectangular shapes. All through-holes 14 may have the same diameter/cross sectional areas. In this case, the mesh size 11a of the grid 11 may be larger than the diameter/cross sectional areas of the through-holes 14 in the first and second material layers 12, 13. Here and hereafter, "the cross-sectional area" or "the diameter" of a through-hole 14 in the first or second material layer 12, 13 is understood to be the largest cross-sectional area or diameter in the through-hole direction in the case that a cross-sectional area or diameter varies in the through-hole direction.

The first material layer 12 and the second material layer 13 may be formed from the same material and, in an embodiment, in one piece. For example, the first material layer 12 and the second material layer 13 may be made of or comprise a silicone, rubber or polymer material.

Figure 2:
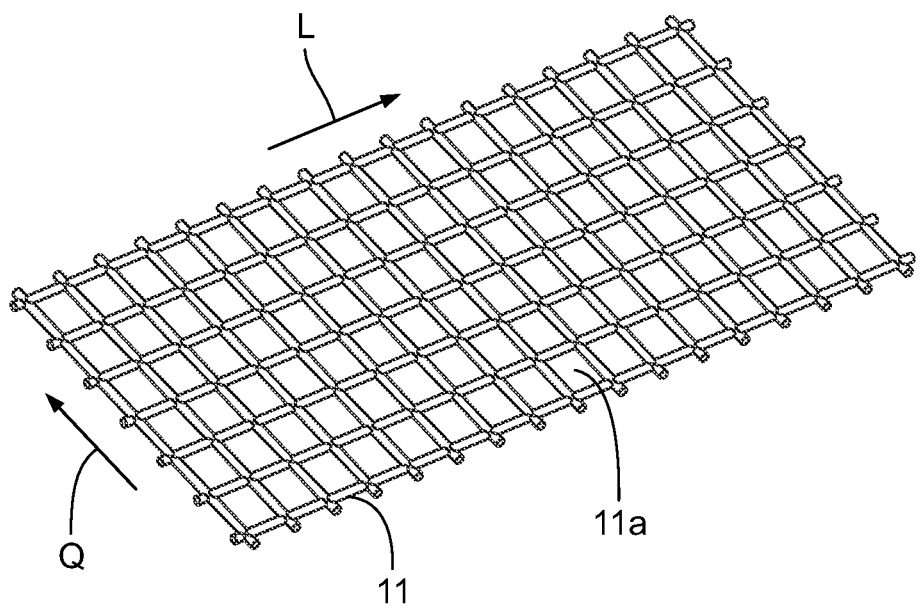
FIG. 2 is a perspective view of a grid of the mat seal.

The grid 11 may be made of or include a plastic material. The grid 11, as shown in FIG. 2, includes the grid meshes 11a with regular mesh sizes in a transverse direction Q and/or a longitudinal direction L or alternatively with irregular mesh sizes in the transverse direction Q and/or longitudinal direction L. The grid 11 may, for example, be provided in the form of a fiber net made of a synthetic resin or plastic, or a fabric band made of a synthetic resin or a plastic. Here and in the following, the term "grid" also includes a grid band or net or net band; no distinction is made between these terms here. In other words, the grid 11 can also be a grid band or net or net band (e.g. a fabric band).

The meshes 11a may be of square or circular shape (same mesh size in longitudinal L and transverse Q direction perpendicular to the through-hole direction). However, other geometric shapes are also possible, so that the mesh size of the grid 11 in the plane perpendicular to the direction of the through-hole in the longitudinal direction L is different from that in the transverse direction Q. In this case, the "mesh size" of the grid 11 here and in the following is understood to be the smaller one of the mesh size in the longitudinal direction L and that in the transverse direction Q. In this case, the mesh size or, respectively, the mesh size in the longitudinal direction L and the mesh size in the transverse direction Q, shall be considered constant (i.e. they do not vary in the longitudinal or transverse direction). In another embodiment, the mesh size may vary in the transverse Q or longitudinal L direction according to the different cross-sectional areas of the through-holes 14. In any case, for each through-hole 14, the cross-sectional area of the grid mesh 11a associated with it is larger than the cross-sectional area of the through-hole 14.

The grid 11 can be much thinner than the first and second material layers 12, 13. Thus, for example, it may only extend in the through-hole direction by a maximum of 1/100 to 1/10, in particular, 1/100 to 1/80 or 1/50, or 1/80 to 1/20, for example, 1/60 to 1/30, of the thickness of the first material layer 12 and/or the thickness of the second material layer 13 in the through-hole direction. In particular, the grid 11 can be a fabric band of the mentioned thickness. The thickness of the first and the second material layer 12, 13 can be the same or different from each other.

In an embodiment, the material selected for the grid 11 is less compressible than the material selected for the first material layer 12 and the second material layer 13. The material selected for the grid 11, thus, has a higher compression modulus than the material selected for the first material layer 12 and the second material layer 13. The provision of the grid 11 with a less compressible material (a first material) compared to the materials of the first and second material layers 12, 13 (a second and a third material) provides an overall reduced and controlled material deformation when feeding through the electrical connections (cables, wires or contacts), an increased stiffness and strength of the mat seal 11 and, consequently, increased safety against installation faults (non-contact or faulty contact) and tightness, in particular, against moisture/water.

By providing the grid 11, a deformation of the material of the first material layer 12 and second material layer 13 is controlled and reduced when cables (leads, contacts) are fed through the through-holes 14, 14a, 14b. In particular, a deformation of the material of the first material layer 12 and second material layer 13 in the plane perpendicular to the through-hole direction is controlled and reduced when a cable is fed through a through-hole 14 and through the grid 11. In particular, it is possible to prevent, when a cable is passed through one of the through-holes 14, 14a, 14b, a significant displacement of one or more adjacent through-holes 14, 14a, 14b that would cause a faulty contact and damage to the material of the first or second material layer 12, 13 when contacting is attempted.

Figure 3:
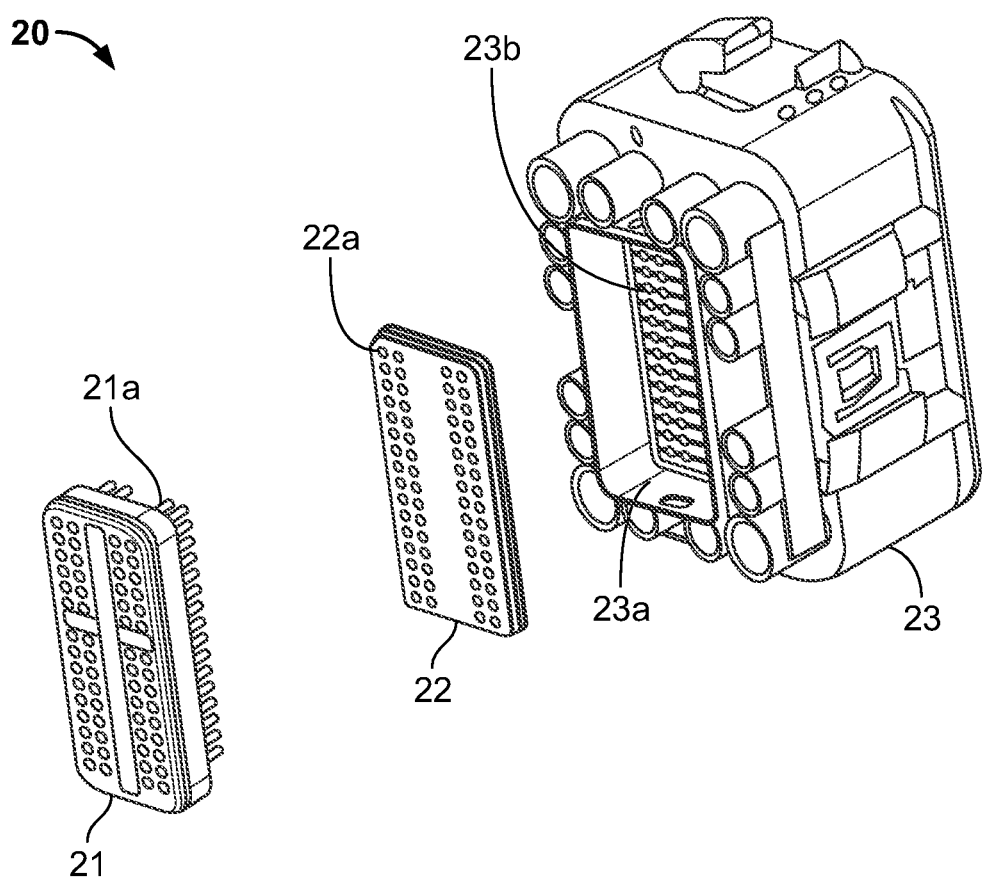
FIG. 3 is an exploded perspective view of a connector according to an embodiment.

A mat seal as described above can be used in the connector 20 shown in FIG. 3. As shown in FIG. 3, an embodiment of a connector 20 according to the invention comprises a multipole plug 21 with a plurality of contacts 21a, a mat seal 22 with through-holes 22a, for example, the mat seal 10 shown in FIG. 1, and a mating plug 23. The mat seal 22 can be received in a receptacle 23a of the mating plug 23. In an embodiment, the connector 20 is a multipole connector with, for example, eighty contact poles. The mat seal 22, in an embodiment, is retained with a retaining device.

For example, when the connector 20 is closed, i.e. when the plug 21 and mating plug 23 are in mechanical engagement, cables (not shown) connected to contacts 21a of connector 21 are connected to contact receptacles (contacts) 23b of the mating plug 23 through the through-holes 22a of the mat seal 22. The mat seal 22 guarantees a reliable mechanical and electrical contact of plug and mating plug through the mat seal 22 with secure sealing against water and dirt. The mat seal 22 can be used in automotive applications, for example.

In an embodiment, the mat seal 10 shown in FIG. 1 or the mat seal 22 shown in FIG. 3 can be made using a multi-component injection molding process with overmolding of the grid 11. This can be done using an injection molding machine equipped with two independently controlled injection units and a corresponding control device. Two embodiments of a method of manufacturing a mat seal for an electrical connector, for example, the mat seal 10 shown in FIG. 1 or the mat seal 22 shown in FIG. 3, are illustrated in the flow diagrams of FIGS. 4 and 5.

Figure 4:
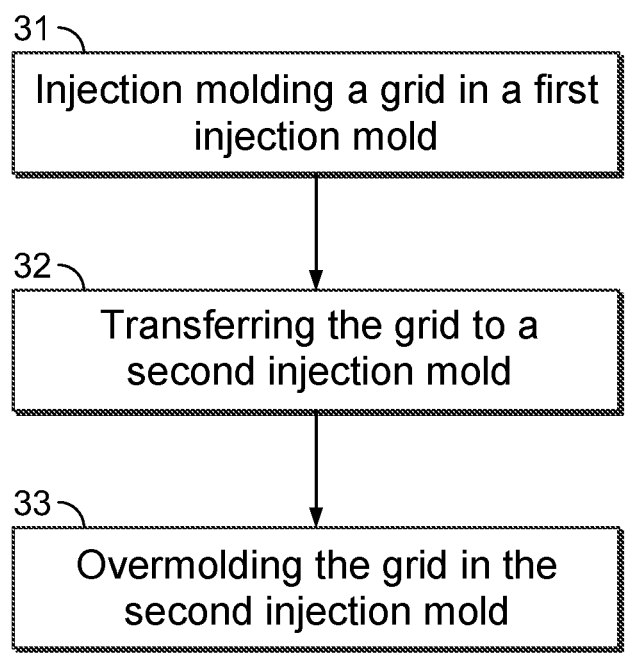
FIG. 4 is a flowchart of a method of manufacturing a mat seal according to an embodiment.

According to the embodiment shown in FIG. 4, a grid, such as grid 11 shown in FIGS. 1 and 2, is injection molded in a first injection mold 31. The injection molded grid is transferred to a second injection mold 32. In this second injection mold, the grid 11 is overmolded 33 with an elastic material, such as the material of the first and second material layers 12, 13 shown in FIG. 1. In the second injection mold, mandrels may be provided so that through holes 14 can be made in the grid seal during forced demolding.

The method includes forming the grid 11 from a first material, forming the first material layer 12 of a second material on a first side of the grid 11, and forming a second material layer of a third material 13 on a second side of the grid 11 opposite the first side. The first material of the grid 11 has a greater compression modulus than the second material of the first material layer 12 and the third material of the second material layer 13. When forming the first and second material layers 12, 13, grid meshes 11a of the grid 11 can be partially filled with the second and/or third material.

Figure 5:
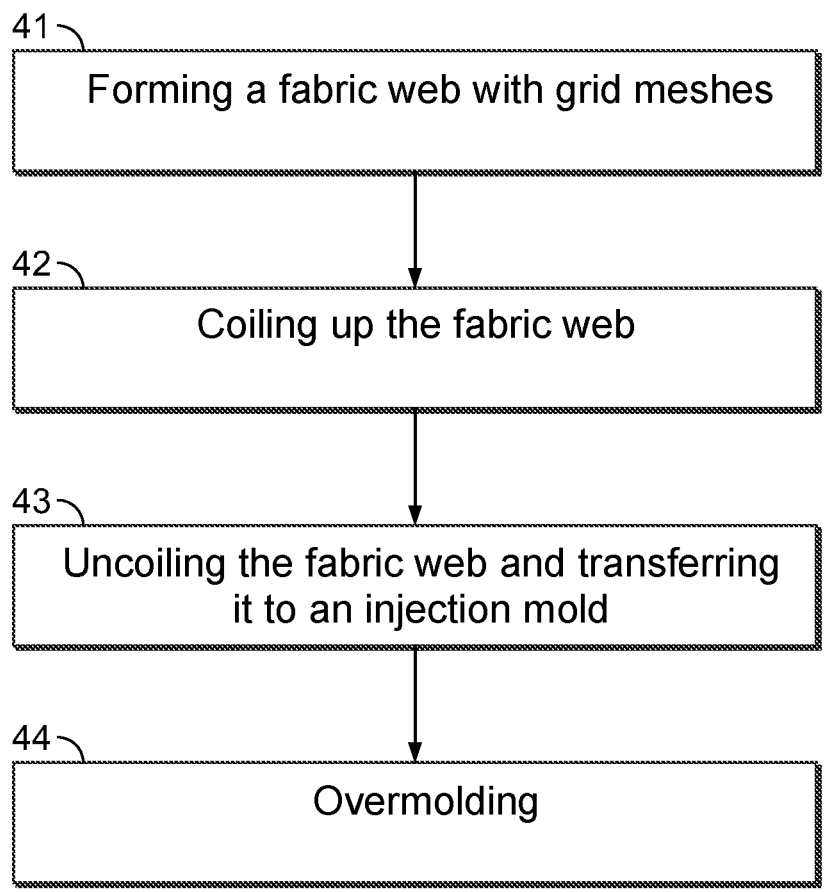
FIG. 5 is a flowchart of a method of manufacturing a mat seal according to another embodiment.

According to the embodiment shown in FIG. 5, a grid in the form of a fabric band is used. A fabric web is formed 41, the fabric web having grid meshes. The fabric web can be temporarily stored on a roll 42. In order to use the fabric web for the production of a large number of mat seals, for example, of the type shown in FIGS. 1 and 3, it is at least partially uncoiled again and fed in unrolled condition to an injection mold 43. By overmolding in the injection mold 44 with a suitable material, for example, silicone, a mat seal with a fabric band contained therein can then be produced. In principle, the fabric web can be tailored or divided into individual fabric bands and a mat seal can be produced by overmolding each fabric band, or a larger section of the fabric web is overmolded and then the overmolded section of the fabric web is tailored or divided to form a plurality of individual mat seals therefrom.

What is claimed is:

1. A mat seal for an electrical connector, comprising:
   a plurality of through-holes extending in a through-hole direction through the mat seal, each of the through-holes sized to sealingly engage with an exterior surface of a respective one of a plurality of conductors of the connector;
   a grid of a first material having a plurality of grid meshes, the grid is arranged with the through-holes extending through the grid meshes, each of a plurality of openings defined by the grid mesh being larger than a corresponding one of the openings defined by the through-holes;
   a first material layer of a second material disposed on a first side of the grid, the first material layer defines first sealing lips extending radially inward into each of the through-holes on the first side of the grid, the first sealing lips adapted to form seals with the exterior surfaces of respective ones of the plurality of conductors of the connector; and
   a second material layer of a third material disposed on a second side of the grid opposite the first side, the second material layer defines second sealing lips extending radially inward into each of the through-holes on the second side of the grid, the second sealing lips adapted to form seals with the exterior surfaces of respective ones of the plurality of conductors of the connector, the first material of the grid has a greater compression modulus than the second material of the first material layer and the third material of the second material layer.

2. The mat seal of claim 1, wherein the first material layer is formed in a single piece with the second material layer.

3. The mat seal of claim 2, wherein the grid is overmolded with the first material layer and the second material layer.

4. The mat seal of claim 1, wherein the grid is made of a fabric band or a fiber net of synthetic resin.

5. The mat seal of claim 1, wherein the second material and the third material are made of or include silicone, rubber or polymer materials.

6. The mat seal of claim 1, wherein each of the through-holes has a same cross-sectional area perpendicular to the through-hole direction.

7. The mat seal of claim 6, wherein a mesh size of the grid is larger than the cross-sectional area of the through holes.

8. The mat seal of claim 1, wherein the through-holes have a different cross-sectional area perpendicular to the through-hole direction.

9. The mat seal of claim 8, wherein the grid has a constant grid mesh size larger than a largest cross-sectional area of the through-holes.

10. The mat seal of claim 8, wherein, for each of the through-holes, a cross-sectional area of the grid mesh is larger than the cross-sectional area of the through-hole.

11. The mat seal of claim 1, wherein a thickness of the grid in the through-hole direction is 1/100 to 1/10 of a thickness of the first material layer in the through-hole direction and/or a thickness of the second material layer in the through-hole direction.

12. The mat seal of claim 1, wherein the first material layer and the second material layer extend into the openings defined by the grid mesh in an axial direction of the through-holes.

13. The mat seal of claim 12, wherein the first material layer and the second material layer completely enclose the grid.

14. A connector, comprising:
   a plug including a plurality of conductors;
   a mating plug; and
   a mat seal arranged between the plug and the mating plug in a closed state of the connector, the mat seal including a plurality of through-holes extending in a through-hole direction through the mat seal, a grid of a first material having a plurality of grid meshes, the grid is arranged with the through-holes extending through the grid meshes, a first material layer of a second material disposed on a first side of the grid, and a second material layer of a third material disposed on a second side of the grid opposite the first side, the first material of the grid has a greater compression modulus than the second material of the first material layer and the third material of the second material layer,
   the plurality of conductors of the plug extending through respective ones of the plurality of through-holes, the first material layer and the second material layer each define sealing lips extending radially inward into each of the through-holes on the first side of the grid and the second side of the grid, respectively, and sealingly engaging with an exterior surface of a respective one of the plurality of conductors of the plug on the first side of the grid and the second side of the grid within the through-holes.

15. A method of manufacturing a mat seal for an electrical connector, comprising:
   forming a grid from a first material;
   forming a first material layer of a second material on a first side of the grid; and
   forming a second material layer of a third material on a second side of the grid opposite the first side, the first material of the grid has a greater compression modulus than the second material of the first material layer and the third material of the second material layer, the first material layer and the second material layer defining a plurality of through-holes aligned with openings of the grid, each of the through-holes defining an opening smaller than a corresponding opening of the grid, the first material layer and the second material layer each defining sealing lips extending radially inward into each of the through-holes on the first side of the grid and the second side of the grid, respectively, and sized to sealingly engage with an exterior surface of a conductor of the electrical connector on each of the first side of the grid and the second side of the grid.

16. The method of claim 15, wherein the first material layer and the second material layer are formed by overmolding the grid with the second material and the third material.

17. The method of claim 15, wherein the grid is formed by injection molding.

18. The method of claim 15, wherein forming the grid includes forming a fabric web, overmolding the fabric web, and dividing the fabric web to produce a plurality of mat seals.

19. The method of claim 15, wherein forming the grid includes forming a fabric web and separating a fabric band from the fabric web.

\* \* \* \* \*